(12) United States Patent
Sung et al.

(10) Patent No.: US 9,495,558 B2
(45) Date of Patent: Nov. 15, 2016

(54) SYSTEMS, METHODS, AND COMPUTER PROGRAM PRODUCTS FOR MANAGING ACCESS CONTROL

(71) Applicant: GOOGLE INC., Mountain View, CA (US)

(72) Inventors: Danny Sung, Arlington, TX (US); Tommy Poon, Frisco, TX (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/224,886

(22) Filed: Mar. 25, 2014

(65) Prior Publication Data
US 2014/0298484 A1    Oct. 2, 2014

Related U.S. Application Data

(60) Provisional application No. 61/805,410, filed on Mar. 26, 2013.

(51) Int. Cl.
*G06F 21/62* (2013.01)
*H04W 12/08* (2009.01)

(52) U.S. Cl.
CPC ........... *G06F 21/6245* (2013.01); *G06F 21/62* (2013.01); *G06F 21/629* (2013.01); *H04W 12/08* (2013.01)

(58) Field of Classification Search
CPC ........................ G06F 21/6245; H04W 12/08
See application file for complete search history.

(56) References Cited

U.S. PATENT DOCUMENTS

| | | | |
|---|---|---|---|
| 5,590,038 A | 12/1996 | Pitroda | 395/241 |
| 5,640,002 A | 6/1997 | Ruppert et al. | 235/472 |

(Continued)

FOREIGN PATENT DOCUMENTS

| | | |
|---|---|---|
| CA | 2 381 614 A1 | 3/2001 |
| EP | 1 222 503 A2 | 7/2002 |

(Continued)

OTHER PUBLICATIONS

Fiorin, Leandro; Palermo, Gianluca; Lukovic, Slobodan; Catalano, Valerio; Silvano, Cristina; "Secure Memory Accesses on Networks-on-Chip", IEEE Transactions on Computers, vol. 57, Issue 9, Jun. 10, 2008, pp. 1216-1229.*

(Continued)

*Primary Examiner* — Victor Lesniewski
(74) *Attorney, Agent, or Firm* — Johnson , Marcou & Isaacs, LLC

(57) ABSTRACT

Systems, methods, and computer program products are provided for managing access control. A first set of access control rules is stored in a memory of mobile communication device. The mobile communication device receives from a trusted server over a communication network a notification message indicating that an access control rule has been updated in a secure element. In response to receiving the notification message, the mobile communication device retrieves from the secure element a second set of access control rules including at least the access control rule that has been updated. The first set of access control rules is updated based on the second set of access control rules retrieved from the secure element. An applet stored on the secure element is accessed via an application running on the mobile communication device, in accordance with the updated first set of access control rules.

18 Claims, 5 Drawing Sheets

(56) References Cited

U.S. PATENT DOCUMENTS

| | | | |
|---|---|---|---|
| 5,748,740 A | 5/1998 | Curry et al. | 380/25 |
| 5,805,702 A | 9/1998 | Curry et al. | 380/24 |
| 5,884,271 A | 3/1999 | Pitroda | 705/1 |
| 5,901,303 A | 5/1999 | Chew | 395/400 |
| 5,940,510 A | 8/1999 | Curry et al. | 380/25 |
| 5,949,880 A | 9/1999 | Curry et al. | 380/24 |
| 6,073,840 A | 6/2000 | Marion | 235/381 |
| 6,105,013 A | 8/2000 | Curry et al. | 705/65 |
| 6,116,505 A | 9/2000 | Withrow | 235/381 |
| 6,131,811 A | 10/2000 | Gangi | 235/380 |
| 6,237,095 B1 | 5/2001 | Curry et al. | 713/178 |
| 6,422,464 B1 | 7/2002 | Terranova | 235/384 |
| 6,587,835 B1 | 7/2003 | Treyz et al. | 705/14 |
| 6,601,759 B2 | 8/2003 | Fife et al. | 235/375 |
| 6,671,358 B1 | 12/2003 | Sossaman et al. | 379/93.12 |
| 6,732,081 B2 | 5/2004 | Nicholson | 705/14 |
| 6,769,607 B1 | 8/2004 | Pitroda et al. | 235/380 |
| 6,813,609 B2 | 11/2004 | Wilson | 705/14 |
| 6,837,436 B2 | 1/2005 | Swartz et al. | 235/472.02 |
| 6,925,439 B1 | 8/2005 | Pitroda | 705/1 |
| 7,083,094 B2 | 8/2006 | Cooper | 235/449 |
| 7,110,792 B2 | 9/2006 | Rosenberg | 455/558 |
| 7,127,236 B2 | 10/2006 | Khan et al. | 455/414.1 |
| 7,155,405 B2 | 12/2006 | Petrovich | 705/26 |
| 7,194,422 B1 | 3/2007 | Killick | 705/14 |
| 7,216,109 B1 | 5/2007 | Donner | 705/64 |
| 7,249,112 B2 | 7/2007 | Berardi et al. | 705/79 |
| 7,286,818 B2 | 10/2007 | Rosenberg | 455/414.1 |
| 7,298,271 B2 | 11/2007 | Sprogis | 340/572.1 |
| 7,308,426 B1 | 12/2007 | Pitroda | 705/35 |
| 7,330,714 B2 | 2/2008 | Rosenberg | 455/412.1 |
| 7,349,885 B2 | 3/2008 | Gangi | 705/41 |
| 7,469,151 B2 | 12/2008 | Khan et al. | 455/558 |
| 7,469,381 B2 | 12/2008 | Ording | 715/702 |
| 7,483,858 B2 | 1/2009 | Foran et al. | 705/39 |
| 7,494,055 B2 | 2/2009 | Fernandes et al. | 235/380 |
| 7,529,563 B1 | 5/2009 | Pitroda | 455/558 |
| 7,571,139 B1 | 8/2009 | Giordano et al. | 705/40 |
| 7,581,678 B2 | 9/2009 | Narendra et al. | 235/451 |
| 7,613,628 B2 | 11/2009 | Ariff et al. | 705/14 |
| 7,631,810 B2 | 12/2009 | Liu et al. | 235/451 |
| 7,693,752 B2 | 4/2010 | Jaramillo | 705/26 |
| 7,708,198 B2 | 5/2010 | Gangi | 235/380 |
| 7,712,658 B2 | 5/2010 | Gangi | 235/380 |
| 7,775,430 B2 | 8/2010 | Lin | 235/383 |
| 7,805,615 B2 | 9/2010 | Narendra et al. | 713/186 |
| 7,828,214 B2 | 11/2010 | Narendra et al. | 235/451 |
| 7,856,377 B2 | 12/2010 | Cohagan et al. | 705/14.3 |
| 7,864,163 B2 | 1/2011 | Ording et al. | 345/173 |
| 7,942,337 B2 | 5/2011 | Jain | 235/492 |
| 7,954,715 B2 | 6/2011 | Narendra et al. | 235/451 |
| 7,954,716 B2 | 6/2011 | Narendra et al. | 235/451 |
| 7,954,717 B2 | 6/2011 | Narendra et al. | 235/451 |
| 7,961,101 B2 | 6/2011 | Narendra et al. | 340/572.1 |
| 7,967,215 B2 | 6/2011 | Kumar et al. | 235/492 |
| 7,991,158 B2 | 8/2011 | Narendra et al. | 380/260 |
| 8,072,331 B2 | 12/2011 | Narendra et al. | 340/572.1 |
| 8,083,145 B2 | 12/2011 | Narendra et al. | 235/451 |
| 8,091,786 B2 | 1/2012 | Narendra et al. | 235/451 |
| 8,131,645 B2 | 3/2012 | Lin et al. | 705/51 |
| 8,140,418 B1 | 3/2012 | Casey et al. | 705/35 |
| 8,196,131 B1 * | 6/2012 | von Behren et al. | 717/168 |
| 8,297,520 B1 * | 10/2012 | Wakerly | G06Q 20/352 235/487 |
| 8,396,808 B2 | 3/2013 | Greenspan | 705/64 |
| 8,429,046 B2 | 4/2013 | Pitroda | 705/35 |
| 8,555,067 B2 * | 10/2013 | Schell et al. | 713/169 |
| 8,646,059 B1 * | 2/2014 | von Behren et al. | 726/9 |
| 9,027,102 B2 * | 5/2015 | Katzer | G06F 21/6245 709/238 |
| 9,226,143 B2 * | 12/2015 | Kulkarni | H04L 63/10 |
| 2002/0049631 A1 | 4/2002 | Williams | 705/14 |
| 2002/0082921 A1 | 6/2002 | Rankin | 705/14 |
| 2002/0174025 A1 | 11/2002 | Hind et al. | 705/26 |
| 2002/0179703 A1 | 12/2002 | Allen | 235/381 |
| 2003/0009382 A1 | 1/2003 | D'Arbeloff et al. | 705/17 |
| 2003/0083042 A1 | 5/2003 | Abuhamdeh | 455/406 |
| 2003/0115126 A1 | 6/2003 | Pitroda | 705/36 |
| 2003/0132298 A1 | 7/2003 | Swartz et al. | 235/472.02 |
| 2003/0200489 A1 | 10/2003 | Hars | 714/703 |
| 2004/0073519 A1 | 4/2004 | Fast | 705/65 |
| 2004/0186768 A1 | 9/2004 | Wakim et al. | 705/14 |
| 2005/0004866 A1 | 1/2005 | Bonalle et al. | 705/39 |
| 2005/0171898 A1 | 8/2005 | Bishop et al. | 705/39 |
| 2005/0222961 A1 | 10/2005 | Staib et al. | 705/64 |
| 2005/0234769 A1 | 10/2005 | Jain et al. | 705/14 |
| 2005/0247777 A1 | 11/2005 | Pitroda | 235/380 |
| 2006/0287004 A1 | 12/2006 | Fuqua | 455/558 |
| 2007/0014407 A1 | 1/2007 | Narendra et al. | 380/259 |
| 2007/0014408 A1 | 1/2007 | Narendra et al. | 380/270 |
| 2007/0198432 A1 | 8/2007 | Pitroda et al. | 705/64 |
| 2007/0207777 A1 | 9/2007 | Owen et al. | 455/411 |
| 2008/0306849 A1 | 12/2008 | Johnson, Jr. et al. | 705/35 |
| 2009/0108064 A1 | 4/2009 | Fernandes et al. | 235/380 |
| 2009/0164322 A1 | 6/2009 | Khan et al. | 705/14 |
| 2009/0221266 A1 | 9/2009 | Ohta et al. | 455/411 |
| 2009/0265471 A1 * | 10/2009 | Li et al. | 709/227 |
| 2010/0190437 A1 * | 7/2010 | Buhot | 455/41.1 |
| 2010/0207742 A1 * | 8/2010 | Buhot et al. | 340/10.51 |
| 2010/0241494 A1 | 9/2010 | Kumar et al. | 705/14.1 |
| 2011/0073663 A1 | 3/2011 | Narendra et al. | 235/492 |
| 2011/0171996 A1 | 7/2011 | Narendra et al. | 455/558 |
| 2011/0223972 A1 | 9/2011 | Narendra et al. | 455/558 |
| 2011/0231238 A1 | 9/2011 | Khan et al. | 705/14.26 |
| 2011/0244796 A1 | 10/2011 | Khan et al. | 455/41.1 |
| 2011/0269438 A1 | 11/2011 | Narendra et al. | 455/414.1 |
| 2011/0271044 A1 | 11/2011 | Narendra et al. | 711/103 |
| 2011/0272468 A1 | 11/2011 | Narendra et al. | 235/492 |
| 2011/0272469 A1 | 11/2011 | Narendra et al. | 235/492 |
| 2011/0302310 A1 | 12/2011 | Diachina et al. | 709/225 |
| 2012/0036563 A1 * | 2/2012 | Glasgow et al. | 726/5 |
| 2012/0064828 A1 | 3/2012 | Khan et al. | 455/41.1 |
| 2012/0109764 A1 | 5/2012 | Martin et al. | 705/17 |
| 2012/0238206 A1 * | 9/2012 | Singh | H04L 63/0492 455/41.1 |
| 2012/0246119 A1 | 9/2012 | Haudenschild et al. | 707/687 |
| 2012/0266220 A1 * | 10/2012 | Brudnicki et al. | 726/6 |
| 2012/0323664 A1 | 12/2012 | Klems | 705/14.26 |
| 2013/0060959 A1 * | 3/2013 | Taveau | H04W 12/08 709/232 |
| 2013/0086669 A1 * | 4/2013 | Sondhi et al. | 726/8 |
| 2013/0102246 A1 * | 4/2013 | Gagne | G06Q 20/3278 455/41.1 |
| 2013/0174266 A1 * | 7/2013 | Smrz | 726/26 |
| 2013/0268437 A1 * | 10/2013 | Desai | G06Q 20/08 705/41 |
| 2013/0332343 A1 * | 12/2013 | Desai | G06Q 20/08 705/39 |
| 2013/0339232 A1 * | 12/2013 | Desai | G06Q 20/08 705/41 |
| 2014/0020068 A1 * | 1/2014 | Desai et al. | 726/4 |
| 2014/0031024 A1 * | 1/2014 | Xie et al. | 455/418 |
| 2014/0058937 A1 * | 2/2014 | Watson | 705/41 |
| 2014/0089113 A1 * | 3/2014 | Desai | G06Q 20/322 705/16 |
| 2014/0129430 A1 * | 5/2014 | Desai | G06Q 20/08 705/39 |
| 2014/0129437 A1 * | 5/2014 | Desai | G06Q 20/08 705/41 |
| 2014/0129438 A1 * | 5/2014 | Desai | G06Q 20/08 705/41 |
| 2014/0130035 A1 * | 5/2014 | Desai | G06Q 20/08 717/172 |
| 2014/0143826 A1 * | 5/2014 | Sharp et al. | 726/1 |
| 2014/0189880 A1 * | 7/2014 | Funk | 726/27 |
| 2014/0228001 A1 * | 8/2014 | Kulkarni | 455/411 |
| 2014/0256251 A1 * | 9/2014 | Caceres | H04B 5/0031 455/41.1 |

FOREIGN PATENT DOCUMENTS

| | | |
|---|---|---|
| EP | 0 766 852 B1 | 8/2004 |
| EP | 1 412 890 A4 | 11/2004 |
| EP | 1 477 943 A2 | 11/2004 |

(56) References Cited

FOREIGN PATENT DOCUMENTS

| | | |
|---|---|---|
| KR | 10-2011-0125698 A | 11/2011 |
| WO | WO 01/18629 A3 | 3/2001 |
| WO | WO 03/012717 A1 | 2/2003 |
| WO | 2014/160715 A1 | 10/2014 |

OTHER PUBLICATIONS

Eun, Hasoo; Lee, Hoonjung; Oh, Heekuck; "Conditional Privacy Preserving Security Protocol for NFC Applications", IEEE Transactions on Consumer Electronics, vol. 59, Issue 1, Feb. 2013, pp. 153-160.*

Benyo, B.; Sodor, B.; Kovacs, L.; Homlok, J.; Fordos, G.; "Security issues of service installation on a multi application NFC environment", IEEE 14th International Conference on Intelligent Engineering Systems, May 5-7, 2010, pp. 145-149.*

Int'l Search Report and Written Opinion issued in connection with Int'l Appl'n No. PCT/US2014/031737 on Jul. 10, 2014 (7 pages).

GlobalPlatform Inc., "GlobalPlatform Device Technology—Secure Element Access Control", Version 1.0, Document Reference: GPE_SPE_013, May 2012 (86 pages).

Wittmann-Regis, "International Preliminary Report on Patentability issued in International Application No. PCT/US2014/031737", mailed on Oct. 8, 2015, 10 pages.

* cited by examiner

SYSTEMS, METHODS, AND COMPUTER PROGRAM PRODUCTS FOR MANAGING ACCESS CONTROL

CROSS REFERENCE TO RELATED APPLICATION

The present application claims priority to U.S. Provisional Application No. 61/805,410, filed on Mar. 26, 2013, the entire contents of which are hereby incorporated by reference herein.

BACKGROUND

1. Field

Example aspects described herein relate generally to mobile wallets in mobile communication devices for use in mobile commerce, and more particularly to systems, methods, and computer program products for managing access control for mobile communication devices that utilize secure elements.

2. Related Art

Mobile communication devices (also referred to herein as mobile devices) are becoming more and more versatile, and are being used in an increasing number of ways to make various everyday tasks simpler and/or more efficient. One area in which mobile devices are being used is mobile commerce. For example, mobile devices are being made to include mobile wallets, which may be used to conduct financial transactions (e.g., payments) and/or non-financial transactions (e.g., venue admissions), without the need for physical cash, checks, credit cards, tickets, and/or the like. In order to safeguard sensitive information (e.g., payment account information) that mobile wallets utilize in conducting such transactions, some mobile devices are made to include, and/or are communicatively coupled to, a secure element that stores such sensitive information.

Controlling access to the secure element is necessary for both security and business reasons. To this end, conventional access control specifications (e.g., Global Platform Access Control (GPAC), for example as described in Global Platform Device Technology—Secure Element Access Control, Version 1.0, Document Reference GPE_SPE_013, May 2012, 86 pages); Gemalto Access Control (GAC); and Public-Key Cryptography Standard No. 15 (PKCS15), each of which is hereby incorporated by reference herein in its entirety, typically require access control rules (also referred to herein as simply "access rules") to be stored on the secure element.

In general, each access rule in a set of access rules stored on the secure element indicates whether a particular application stored on the mobile device is permitted to access a particular applet stored on the secure element. Any given one of the access rules may correspond to one or more of the applications stored on the mobile device and one or more of the applets stored on the secure element.

Some access control specifications permit the access rules stored in the secure element to be updated (e.g., added, modified, or deleted), for example, by way of a wireless communication protocol, such as an over-the-air (OTA) communication protocol. The secure element also stores a refresh tag (e.g., a flag, a date, a time, and/or another type of temporal indicator) that includes a value that indicates when any of the access rules stored on the secure element was most recently updated. Each time any of the access rules stored on the secure element is updated in the secure element, the value of the refresh tag in the secure element is updated as well.

In some cases, an enforcer module (also referred to herein as "enforcer") residing on the mobile device retrieves from the secure element, and stores, the set of access rules. According to some access control specifications, the enforcer is required to periodically poll the refresh tag to determine whether any of the access rules stored in the secure element has been updated since the last time the enforcer retrieved the access rules from the secure element. In addition to periodic polling, the enforcer polls the refresh tag of the secure element each time access control is to be enforced (e.g., upon receiving a request for access to information and/or performance of an action that is protected by the rules, such as a request to open a secure communication channel using an application or applet stored on the secure element). If, upon polling the refresh tag, the enforcer determines that one or more pertinent access control rules has been updated since the most recent polling, then the enforcer retrieves from the secure element an updated set of access rules (or a subset of the updated set of access rules), and updates a local set of rules stored on the mobile communication device so as to be consistent with the rules stored in the secure element. One example of such a polling scheme may be found in GlobalPlatform Device Technology—Secure Element Access Control, Version 1.0, Document Reference GPE_SPE_013, Section 5—Remote Interface Based on RAM, May 2012, 86 pages), the entire contents of which are hereby incorporated by reference herein.

In one example, in order to enable the enforcer to determine whether any of the access rules stored in the secure element has been updated since the last time the enforcer retrieved the access rules from the secure element, each time the enforcer retrieves from the secure element, and stores, the access rules, the enforcer also retrieves from the secure element, and stores, the refresh tag that includes a value that indicates when the set of access rules stored on the secure element was most recently updated. In this way, the enforcer may determine whether any of the access rules stored in the secure element has been updated since the last time the enforcer retrieved the access rules from the secure element, by comparing the value of the refresh tag stored in the secure element to the value of the refresh tag stored by the enforcer.

If the value of the refresh tag stored in the secure element matches the value of the refresh tag stored by the enforcer, then that would indicate that the access rules stored by the enforcer are up-to-date; that is, that none of the access rules stored in the secure element has been updated since the last time the enforcer retrieved the access rules from the secure element. If, on the other hand, the value of the refresh tag stored in the secure element does not match the value of the refresh tag stored by the enforcer, then that would indicate that the access rules stored by the enforcer are not up-to-date; that is, that one or more of the access rules stored in the secure element has been updated since the last time the enforcer retrieved the access rules from the secure element. In this case, the enforcer would retrieve from the secure element, and store, the updated set of access rules and the updated value of the refresh tag.

One drawback, however, to polling schemes such as the scheme described above, is that they can result in an inefficient utilization of computing resources, such as the utilization of processor power, processor time, memory, communication channels, and the like. For instance, when no updates have been made to the access rules, polling the refresh tag periodically would needlessly render a processor of the mobile communication device busy.

Likewise, when no updates have been made to the access rules, polling the refresh tag upon receiving a request for information and/or an action protected by the rules would needlessly render the processor busy, and would also negatively impact the user's experience by delaying the granting of the request until after the polling has been completed.

Moreover, even when an update has been made to the access rules, polling the refresh tag upon receiving a request for information and/or an action protected by the rules would negatively impact the user's experience by delaying the granting of the request until after both the polling of the refresh tag and the updating of the local access rules have been completed.

Given the foregoing, it would be beneficial to enable access rules to be updated and enforced in an efficient manner that improves both the user's experience and the utilization of computing resources.

SUMMARY

The example embodiments herein provide systems, methods, and computer program products for managing access control.

In accordance with one example aspect herein, a first set of access control rules is stored in a memory of mobile communication device. The mobile communication device receives from a trusted server over a communication network a notification message indicating that an access control rule has been updated in a secure element. In response to receiving the notification message, the mobile communication device retrieves from the secure element a second set of access control rules including at least the access control rule that has been updated. The first set of access control rules is updated based on the second set of access control rules retrieved from the secure element. An applet stored on the secure element is accessed via an application running on the mobile communication device, in accordance with the updated first set of access control rules.

In another example embodiment, the notification message is pushed to the mobile communication device each time the trusted server transmits an update message to the secure element to cause at least one access control rule of the second set of access control rules to be updated.

In one example herein, the trusted server pushes the notification message to the mobile communication device by way of a notification server.

In accordance with some example aspects herein, a plurality of applets stored on the secure element are accessed, in succession, without performing a polling process of a refresh tag of the secure element in between each accessing.

In another example herein, the mobile communication device includes the secure element.

A request to access the applet is communicated, in one example, and the retrieving of the second set of access control rules from the secure element is performed before the communicating of the request to access the applet.

The access control rule that has been updated indicates whether the application has permission to access the applet stored on the secure element, in accordance with another example herein.

BRIEF DESCRIPTION OF THE DRAWINGS

The features and advantages of the example embodiments presented herein will become more apparent from the detailed description set forth below when taken in conjunction with the following drawings.

DETAILED DESCRIPTION

I. Overview

Figure 1:
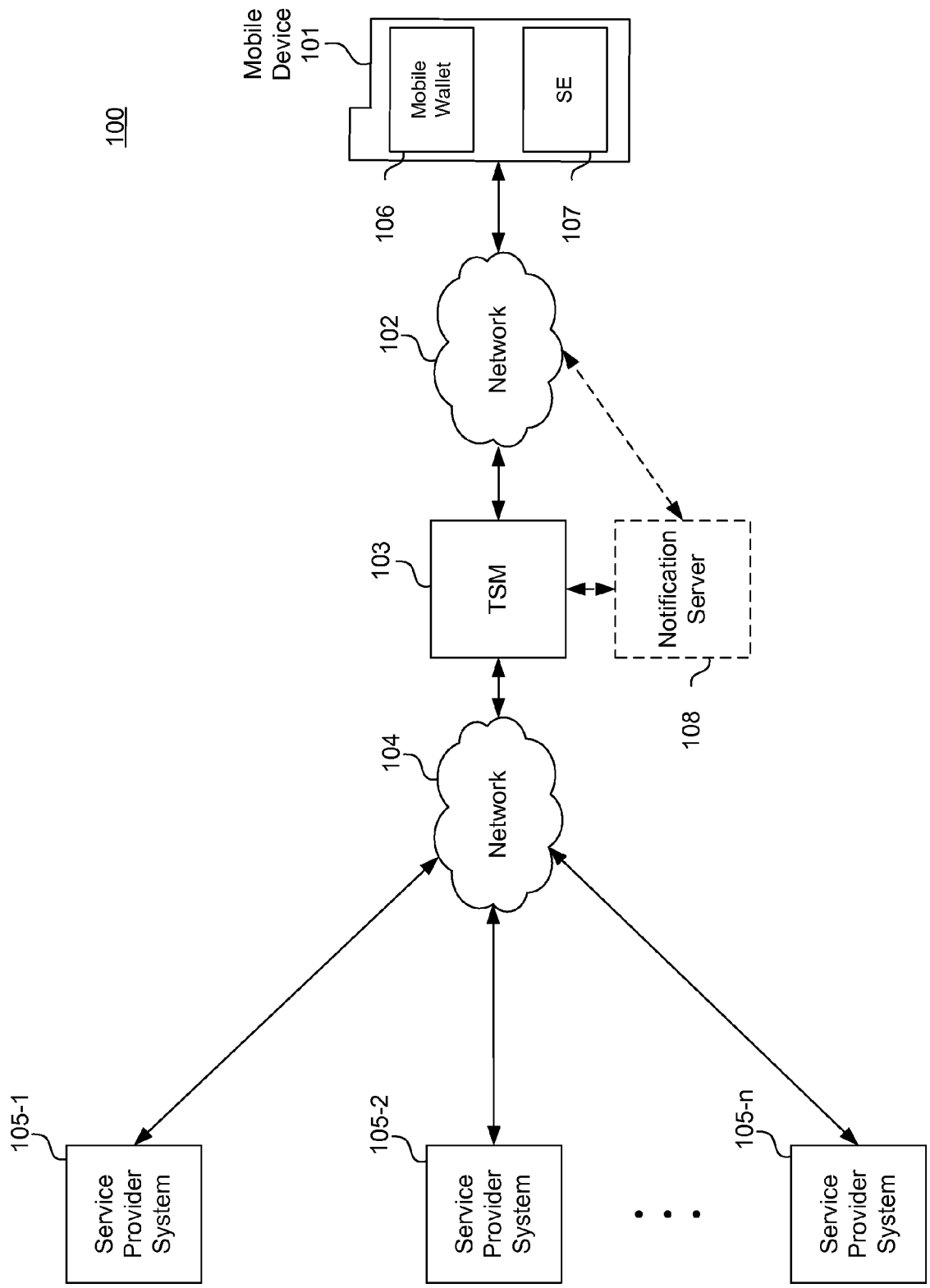
FIG. 1 is a diagram of an example system for managing access control, in accordance with various example embodiments herein.

The terms "payment product" and "card" may be used interchangeably herein to refer to a product, such as, for example, a credit card, a general purpose reloadable (GPR) card, and/or the like, that may be used to conduct financial transactions.

The term "service provider data" as used herein generally refers to data relating to one or more service providers, service provider systems, and/or services provided by one or more service providers. In some example embodiments herein, service provider data refers to any data associated with a service provider that is stored in a wallet database and/or in a wallet client database.

The terms "access control rule" and "access rule" may be used interchangeably herein to refer to a rule that governs access to information stored on a secure element. For example, an access rule may indicate which applications installed on a mobile communication device are permitted to access which applications, applets, and/or other information stored on a secure element coupled to or installed in the mobile communication device. One example set of access rules that may be stored on a secure element and/or by an enforcer, and/or by another component of a mobile device is provided below in Table 1.

TABLE 1

| Rule ID | Identifier (e.g., Hash Value) of Mobile Device Application | Application Identifier (AID) of Secure Element Applet | Permission for Mobile Device Application to Access Secure Element Applet |
| --- | --- | --- | --- |
| Rule 1 | Hash value 1 | AID A | Allow |
| Rule 2 | Hash value 1 | AID B | Disallow |
| Rule 3 | Hash value 2 | Any | Allow |
| Rule 4 | Hash value 2 | AID B | Disallow |
| Rule 5 | Hash value 2 | AID C | Disallow |

Each of the example access rules shown in Table 1 indicate whether a particular mobile device application (e.g., as identified by a corresponding hash value) is allowed or disallowed to access a particular applet (e.g., as identified by an application identifier (AID)) stored on the secure element.

Another example set of access rules that may be stored on a secure element and/or by an enforcer, and/or by another component of a mobile device is provided below in Table 2.

TABLE 2

| Rule ID | Application Identifier (AID) of Secure Element Applet | Rule Description |
| --- | --- | --- |
| Rule 1 | AID A | Allow mobile device applications signed with Certificate-A to access the secure element applet having AID A |
| Rule 2 | AID B | Allow all mobile device applications to access the secure element applet having AID B |
| Rule 3 | Any Applet | Allow mobile device applications signed with Certificate-B to access all secure element applets |
| Rule 4 | AID C | Disallow mobile device applications signed with Certificate-C to access the secure element applet having AID C |

The example access rules shown in Table 2 indicate conditions (e.g., whether an application is signed with a particular certificate) based upon which access to one or more (or all) applets stored on the secure element is allowed or disallowed.

Presented herein are novel and inventive systems, methods, and computer program products for managing access control. In accordance with some aspects described herein, systems, methods, and computer program products are provided that enable access rules to be updated and enforced in an efficient manner that improves both the user's experience and the utilization of computing resources (e.g., the utilization of processor power, processor time, memory, communication channels, and the like).

Unlike existing approaches to managing access control, which employ an inefficient polling scheme whereby, for example, a refresh tag associated with access rules is periodically polled, irrespective of whether any updates have been made to the access rules, in accordance with the example aspects described herein, a triggers scheme is provided such that updates to access rules need only be retrieved upon the access rules having been updated.

Also, the example aspects described herein, unlike existing approaches, avoid the need to poll the refresh tag upon receiving a request for information and/or an action protected by the access rules. The user's experience is thus improved since the granting of the request need not be delayed until after both the polling of the refresh tag and the updating of the local access rules have been completed.

II. System

FIG. 1 is a diagram of an example system 100 for managing access control. The system 100 includes a mobile device 101, a network 102, a trusted service manager (TSM) 103, a network 104, and one or more service provider (SP) systems 105-1, 105-2, 105-n (collectively "105").

The mobile device 101 may be a cellular phone, a tablet computer, or another type of electronic device with connectivity to one or more mobile networks. As will be described in further detail below in connection with FIG. 2, the mobile device 101 includes several components (such as, for example, a mobile wallet 106 and a secure element 107) which enable the mobile device to be used to conduct financial transactions (e.g., payments) and/or non-financial transactions (e.g., venue admissions), without the need for physical cash, checks, credit cards, tickets, and/or the like. Although the secure element 107 is shown in FIG. 1 as being included within the mobile device 101, this is for convenience only and should not be construed as limiting. In other example embodiments, the secure element 107 may be external to and/or removable from the mobile device 101.

The mobile device 101 is communicatively coupled to the TSM 103 by way of the network 102. The network 102 may be a mobile phone cellular network, a radio network, a WI-FI network, and/or another type of network. In some example embodiments, the network 102 is operated by a corresponding mobile network operator (MNO) (not shown in FIG. 1). The network 102 may be referred to as an "over-the-air" (OTA) network since it enables systems and/or devices to communicate using wireless standards.

The TSM 103 is a module, implemented in hardware and/or software, that functions as an intermediary between entities (e.g., service provider systems 105, mobile wallets 106, secure elements 107, etc.) in a mobile commerce environment. In one example embodiment herein, the TSM 103 represents a central TSM managed by a mobile wallet provider (e.g., a provider of the mobile wallet 106). The TSM 103, for example, manages communications between entities, such as the SP systems 105 and the mobile device 101 (e.g., the mobile wallet 106, the secure element 107, and/or any other component of the mobile device 101), and also provides interfaces for communication with other computer systems. The TSM 103 communicates with the mobile device 101 via the network 102 using security protocols such as, for example, a GlobalPlatform secure channel protocol, secure sockets layer (SSL), transport layer security (TLS), and/or another security protocol.

The TSM 103 also provisions applets, such as contactless applets associated with the service provider systems 105, to the mobile device 101 for use by the mobile wallet 106, for example. The TSM 103 remotely distributes and remotely manages (e.g., by updating access rules for the applets) the contactless applets by communicating with the secure element 107.

Figure 4:
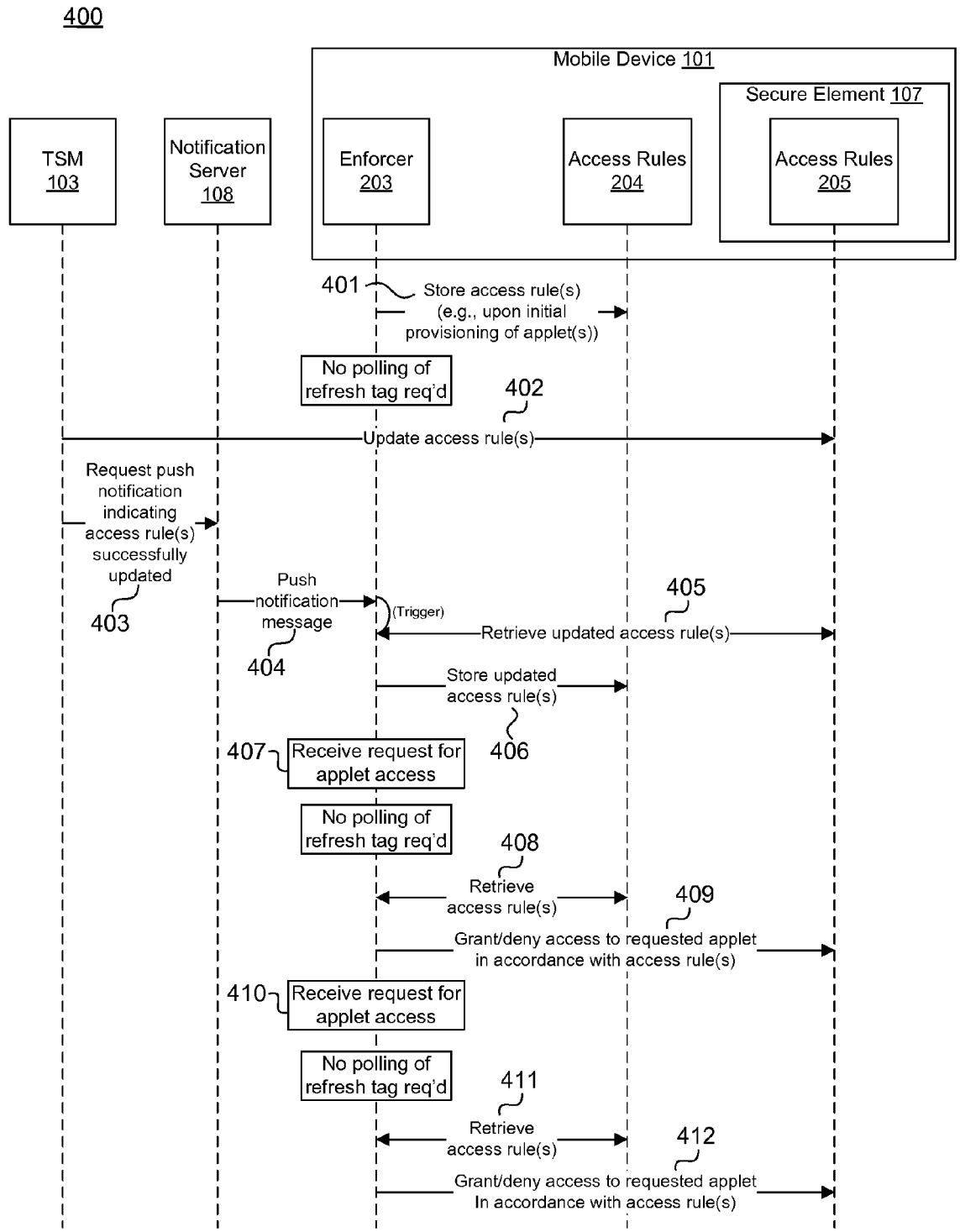
FIG. 4 shows another example procedure for managing access control, in accordance with an example embodiment herein.

As will be described in further detail below in connection with FIG. 4, in one example embodiment, a notification service, running on the TSM 103 or on a separate notification server 108, is used to provide the mobile device 101 with notifications regarding updates to access rules. In this way, updates to access rules need only be retrieved from the secure element 107 upon the access rules having been updated. This enables access rules to be updated and enforced in an efficient manner that improves both the user's experience and the utilization of computing resources (e.g., the utilization of processor power, processor time, memory, communication channels, and the like). Also, the example aspects described herein avoid the need to poll the refresh tag upon receiving a request for information and/or an action protected by the access rules. The user's experience thus may be improved since the granting of the request need not be delayed until after both the polling of the refresh tag and the updating of the local access rules have been completed.

The notification server 108 may be communicatively coupled to the mobile device 101 by way of the network 102, which, as described above, may be a mobile phone cellular network, a radio network, a WI-FI network, and/or another type of network. In some example embodiments, the notification server 108 is communicatively coupled to the mobile device 101 by way of an additional network (e.g., a mobile phone cellular network, a radio network, a WI-FI network, and/or another type of network; not shown in FIG. 1) that is distinct from the network 102. The notification server 108 may be communicatively coupled to the TSM 103 by way of a direct connection, a proprietary network, the network 102, and/or any other type of communication path.

In one example embodiment, the TSM 103 manages communications between the mobile wallet 106 and one of the SP systems 105 in order to request and obtain data for use in a mobile financial or non-financial transaction. For example, the TSM 103 provides access rules to the secure element 107 by way of the network 102, the access rules indicating which applications (e.g., the mobile wallet 106) installed on the mobile device 101 have permission to access which information (e.g., applets) stored on the secure element 107. The TSM 103 may provide the access rules upon an initial installation of a corresponding application on the mobile device 101, and/or may provide updates to the access rules after the corresponding application has been installed on the mobile device 101. The updates to the access rules may be initiated by the TSM 103, by the SP systems 105, by the mobile device 101, and/or by any other entity (e.g., an entity not shown in FIG. 1).

The TSM 103 is communicatively coupled to the SP systems 105 by way of the network 104. The network 104 may be a virtual private network (VPN), a network using Hypertext Transfer Protocol (HTTP) standards, the Internet, and/or another type of network.

The SP systems 105, in some example embodiments, are systems owned, operated, maintained, and/or provided by service providers to enable customers or consumers to utilize one or more services of the service provider.

Figure 2:
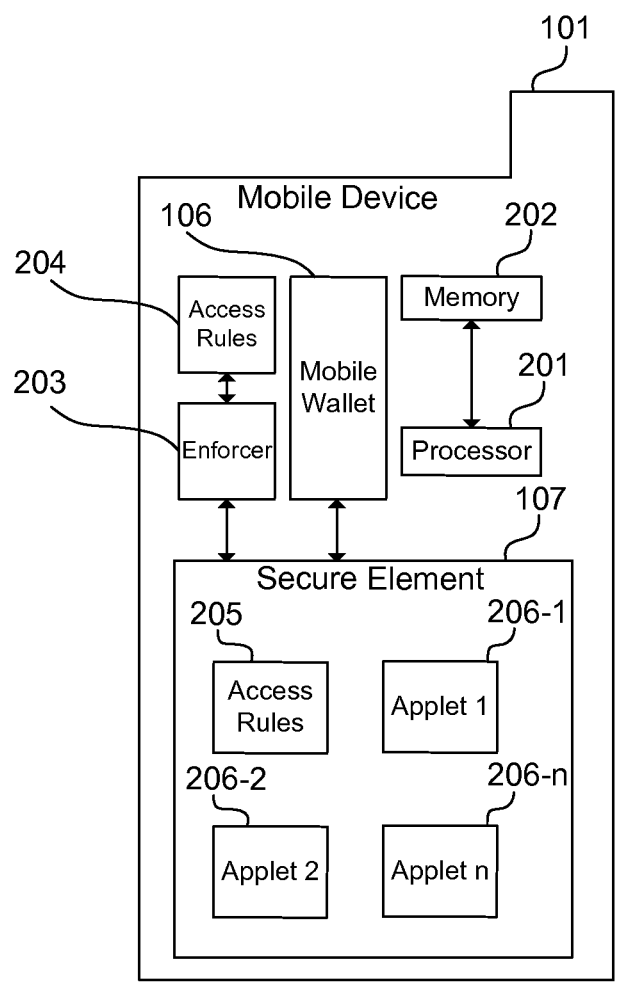
FIG. 2 shows an example mobile communication device, in accordance with an example embodiment herein.

Having described the example system 100 for managing access control, reference will now be made to FIG. 2 to describe in further detail the example mobile device 101. As shown in FIG. 2, the mobile device 101 includes the mobile wallet 106 and the secure element 107, which are mentioned above in connection with FIG. 1. Although the secure element 107 is shown in FIG. 2 as being included within the mobile device 101, this is for convenience only and should not be construed as limiting. In other example embodiments, the secure element 107 may be external to the mobile device 101.

The mobile device 101 also includes a processor 201, a memory 202, an enforcer 203, and locally stored (e.g., stored locally in one or more memories of the mobile device 101) access rules 204. It should be understood that, although not shown in FIG. 2 for purposes of convenience, the mobile device 101 may include other components, such as a mobile operating system, other applications, a display (e.g., a touchscreen display), a user interface, a keyboard, an antenna, and/or the like. Additionally, although not shown in FIG. 2 for purposes of convenience, the components of mobile device 101 may be interconnected via any number of paths, such as a communication bus, direct point-to-point links, and/or the like.

In general, the processor 201 executes instructions that may be stored in the memory 202, the mobile wallet 106, the enforcer 203, the secure element 107, and/or in any other component of the mobile device 101, to enable the mobile device 101 to perform certain functions. The memory 202 may also store data that is generated and/or used by the processor 201 in executing such instructions.

The mobile wallet 106 is an interactive application stored in a non-transitory memory of the mobile device 101. In one example embodiment, the mobile wallet 106 includes instructions that, when executed by the processor 201, enable the mobile communication device 101 to (1) access information or utilize one or more services provided by the service provider systems 105, (2) communicate with the service provider systems 105, and/or (3) interact with contactless services and/or control the operation of contactless hardware of the mobile device 101, for example, to conduct contactless transactions and/or process commerce information such as offer and/or loyalty information.

The mobile wallet 106 also includes instructions which, when executed by the processor 201, cause the mobile device 101 to act as an instrument for processing transactions such as financial transactions, in one example. The mobile wallet 106 provides an interface for receiving inputs and displaying outputs. The mobile wallet 106 communicates with the secure element 107 and applets 206 (described below) stored on the secure element 107, using commands transmitted via application programming interfaces (APIs) (not shown in FIG. 2).

In one example, the mobile wallet 106 stores data (e.g., an account number corresponding to an account provided by the service provider for use via the mobile wallet, and/or any other type of data associated with the mobile wallet and/or with a service provider) that the mobile wallet 106 utilizes to perform certain functions. For instance, the mobile wallet 106 may store applet data regarding one or more applet(s) (e.g., the applets 206 described below) that the mobile wallet 106 uses to access and/or interact with the applets 206.

The secure element 107 is a platform onto which service account information and corresponding applications may be added, stored, personalized, and managed. The secure element 107 includes hardware and software, and implements interfaces and protocols that enable the secure storage of data, such as credentials, service account information, and applications (also referred to herein as "applets") that may be used for conducting financial and/or non-financial transactions. In one example, the applets may correspond to a service (e.g., payment, commerce, ticketing) offered by a service provider (e.g., a service provider associated with one of the SP systems 105).

The secure element 107 may be implemented in different form factors, such as, for example, a Universal Integrated Circuit Card (UICC), an embedded secure element, and/or a separate chip or secure device (e.g., a near-field communication (NFC) enabler) that can be inserted into a slot on the mobile device 101. In one example embodiment, the mobile wallet 106 communicates with the secure element 107 using ISO 7816 commands, in order to conduct contactless transactions. The secure element 107 also stores security-critical applets, such as those involving payment and account credentials, which require secure hardware storage and a secure execution environment.

The secure element 107 includes secure element access rules 205 and one or more applets 206-1, 206-2, 206-$n$ (collectively "206"). In one example embodiment, the one or more applets 206-1, 206-2, 206-$n$ are associated with respective ones of the SP systems 105-1, 105-2 ... 105-$n$ described above in connection with FIG. 1. The applets may be, in one example, contactless applets associated with the service provider systems 105, which are provisioned by the TSM 103 on the mobile device 101 for use by the mobile wallet 106. The TSM 103 remotely distributes and remotely manages the contactless applets by accessing the secure element 107, for example, to provide updates to access rules associated with the applets.

The applets 206 may include instructions that, when executed by the processor 201, enable a user of the mobile device 101 to communicate with, and/or utilize one or more services provided by, the corresponding service provider. For example, an applet 206 provided by a payment product issuer, may enable the user to check a balance of the user's account, view transaction history and/or other notifications regarding the user's account, and/or the like.

The enforcer 203 is a module, implemented in hardware and/or software, that enforces access rules that govern which applications installed on the mobile device 101 are permitted to access which information (e.g., applets 206) stored on the secure element 107. In some example embodiments herein, the enforcer 203 utilizes the memory 202 of the mobile device 101 and/or utilizes a separate memory included in the enforcer 203 (not shown in FIG. 2) to store data and/or instructions that the enforcer 203 uses to execute one or more functions (e.g., to enforce access rules). As will be described in further detail below in connection with FIGS. 3 and 4, in accordance with one example embodiment, updates to the access rules 205 are provided to the secure element 107 by the TSM 103. The enforcer 203 also stores a local set of access rules 204 (e.g., which may be stored on the memory 202 of the mobile device 101) that mirror the access rules 205 stored in the secure element 107. In this way, the mobile wallet 106 may access one or more of the applets 206 in the secure element 107 in accordance with the local access rules 204, without having to retrieve the access rules 205 in the secure element 107.

III. Procedure

Figure 3:
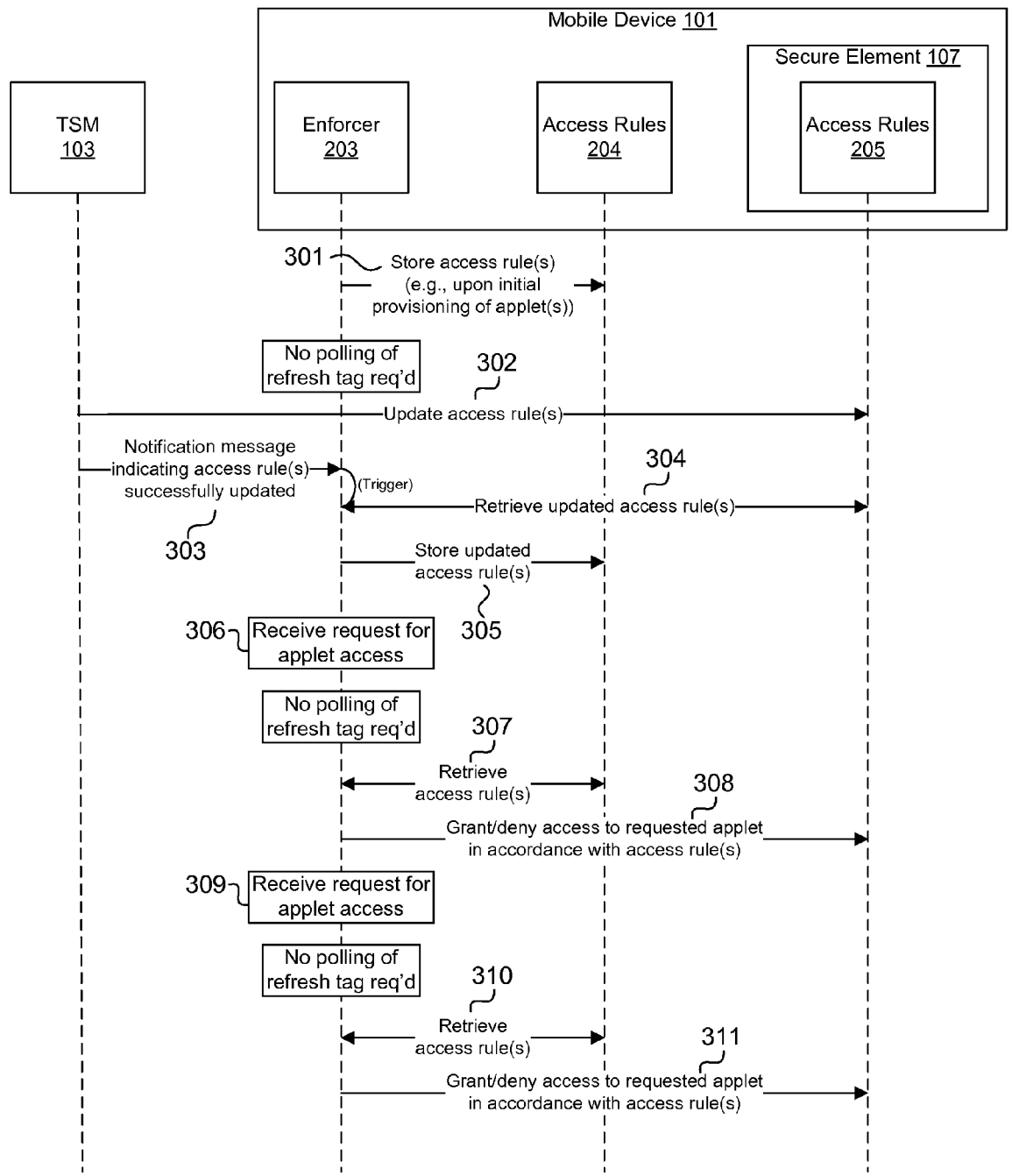
FIG. 3 shows an example procedure for managing access control, in accordance with an example embodiment herein.

Having described an example system 100 for managing access control, reference will now be made to FIG. 3 to describe an example procedure 300 for managing access control, in accordance with an example embodiment herein. In the following description of the procedure 300, reference will also be made to certain elements of FIG. 1 (e.g., one or more of elements 101 through 108) and/or of FIG. 2 (e.g., one or more of elements 201 through 206), which are described in further detail above.

At step 301, the enforcer 203 locally (e.g., in a memory local to the mobile device 101) stores an initial version of the access rules 204, which, in one example, are received (not shown in FIG. 3) from the TSM 103 upon an initial provisioning of the applets 206 on the secure element 107. The initial version of the access rules 204 may include a plurality of access rules corresponding to the plurality of applets 206-1, 206-2 . . . 206-n, respectively. Additionally, although not shown in FIG. 3 for purposes of convenience, in one example, a copy/duplicate of the initial version of the access rules 204 is also stored on the secure element 107 in the form of the access rules 205, upon the initial provisioning of the applets 206 on the secure element 107.

At step 302, the TSM 103 communicates an update to one or more access rules 205 stored on the secure element 107. The update may be triggered by a service provider system 105, the TSM 103 itself, by an administrator computer (not shown in the Figures) coupled to the TSM 103, and/or by another system. The update may include, for example, new credentials, a new payment account number, and/or the like to be used in connection with any of the applets 206.

Upon receiving the update from the TSM 103 at block 302, the updated access rules 205 are stored in the secure element 107.

Once the access rules are successfully updated, the TSM 103 communicates, at step 303, a notification message to the enforcer 203, indicating that at least one of the access rules has been updated.

In one example embodiment, the enforcer 203 is configured such that the receipt of the notification message communicated at step 303 triggers the enforcer 203 to retrieve, at step 304, the updated access rules 205 from the secure element 107. By virtue of this trigger, the enforcer 203 may avoid the need to poll the refresh tag of the secure element 107 (whether periodically and/or upon receiving a request to access information on the secure element 107) to determine whether the access rules are up-to-date. That is, in accordance with this example embodiment, no polling of the refresh tag is required unless and until a notification message is received by the enforcer 203 indicating that the access rules have been updated. In this way, processing resources may be more efficiently utilized and network traffic may be decreased, since unnecessary polling messages may be discontinued.

At step 305, the enforcer 203 updates the locally stored access rules 204 based on the updated access rules 205 retrieved from the secure element 107 at step 304.

At step 306, the enforcer 203 receives a request for access to an applet 206 stored on the secure element 107. The request for access to the applet 206 may, in one example, be triggered by a request from a user to access a payment product associated with the applet 206 (e.g., an applet 206 associated with one of the SP systems 105) and provided via the mobile wallet 106.

At step 307, the enforcer 203 retrieves, from the locally stored access rules 204, one or more access rules that are associated with the applet 206 to which access was requested at step 306.

At step 308, the enforcer 203 grants or denies access to the applet 206 (stored in the secure element 107) that was requested at step 306, in accordance with the one or more corresponding access rules retrieved at step 307 from the locally stored access rules 204. Since no polling of the refresh tag is required upon receiving at step 306 the request for access, the user experience may be improved, since the granting of the request need not be delayed until after both the polling of the refresh tag and the updating of the local access rules have been completed.

At step 309, the enforcer 203 receives a subsequent request for access to an applet 206 stored on the secure element 107. The applet 206 to which access is requested at step 309 may be the same as or different from the applet 206 to which access was requested at step 306.

At step 310, the enforcer 203 retrieves, from the locally stored access rules 204, one or more access rules that are associated with the applet 206 to which access was requested at step 309.

At step 311, the enforcer 203 grants or denies access to the applet 206 (stored in the secure element 107) that was requested at step 309, in accordance with the one or more corresponding access rules retrieved at step 308 from the locally stored access rules. Again, since no polling of the refresh tag is required upon receiving at step 309 the request for access, the user experience may be improved, since the granting of the request need not be delayed until after both the polling of the refresh tag and the updating of the local access rules have been completed. Additionally, since no polling of the refresh tag need be performed in between successively received requests for access to applets, processing resources may be more efficiently utilized.

Having described a first example procedure 300 for managing access control, reference will now be made to FIG. 4 to describe another example procedure 400 for managing access control, in accordance with an example embodiment herein.

As will be apparent from the description below, one difference between the example procedure 300 described above and the example procedure 400 described below is that the procedure 400 employs an optional notification server 108. In one example embodiment, the notification server 108 provides the TSM 103 with communication protocol flexibility. For instance, the TSM 103 may push notifications to the mobile device 101 by using WI-FI, 3G, 4G LTE, the Short Message Service (SMS) protocol, or any other suitable communication protocol. In one example, the TSM 103 may utilize the notification server 108 to push notifications to the mobile device 101 by using a communication protocol that is different from the communication protocol(s) available by way of the network 102.

At step 401, the enforcer 203 locally stores an initial version of the access rules 204, which, in one example, are received (not shown in FIG. 4) from the TSM 103 upon an initial provisioning of the applets 206 on the secure element 107. The initial version of the access rules 204 may include a plurality of access rules corresponding to the plurality of applets 206-1, 206-2 . . . 206-n, respectively. Additionally, although not shown in FIG. 4 for purposes of convenience, in one example, a copy/duplicate of the initial version of the access rules 204 is also stored on the secure element 107 in the form of the access rules 205, upon the initial provisioning of the applets 206 on the secure element 107.

At step 402, the TSM 103 communicates an update to one or more access rules 205 stored on the secure element 107. The update may be triggered by a service provider system 105, the TSM 103 itself, by an administrator computer (not shown in the Figures) coupled to the TSM 103, and/or by another system. The update may include, for example, new credentials, a new payment account number, and/or the like to be used in connection with any of the applets 206.

Upon receiving the update from the TSM 103 at block 402, the updated access rules 205 are stored in the secure element 107.

At step 403, upon successfully updating the access rules 205 stored in the secure element 107, the TSM 103 communicates to the notification server 108 a request that the notification server 108 push a notification message to the enforcer 203 to indicate that the access rules 205 have been successfully updated.

Upon receiving at step 403 the request from the TSM 103, the notification server 108 communicates, at step 404, a notification message to the enforcer 203, indicating that at least one of the access rules has been updated.

In one example embodiment, the enforcer 203 is configured such that the receipt of the notification message communicated at step 404 triggers the enforcer 203 to retrieve, at step 405, the updated access rules 205 from the secure element 107. By virtue of this trigger, the enforcer 203 may avoid the need to poll the refresh tag of the secure element 107 (whether periodically and/or upon receiving a request to access information on the secure element 107) to determine whether the access rules are up-to-date. That is, in accordance with this example embodiment, no polling of the refresh tag is required unless and until a notification message is received by the enforcer 203 indicating that the access rules have been updated. In this way, processing resources may be more efficiently utilized and network traffic may be decreased, since unnecessary polling messages may be discontinued.

At step 406, the enforcer 203 updates the locally stored access rules 204 based on the updated access rules 205 retrieved from the secure element 107 at step 304.

At step 407, the enforcer 203 receives a request for access to an applet 206 stored on the secure element 107. The request for access to the applet 206 may, in one example, be triggered by a request from a user to access a payment product associated with the applet 206 (e.g., an applet 206 associated with one of the SP systems 105) and provided via the mobile wallet 106.

At step 408, the enforcer 203 retrieves, from the locally stored access rules 204, one or more access rules that are associated with the applet 206 to which access was requested at step 407.

At step 409, the enforcer 203 grants or denies access to the applet 206 (stored in the secure element 107) that was requested at step 407, in accordance with the one or more corresponding access rules retrieved at step 408 from the locally stored access rules 204. Since no polling of the refresh tag is required upon receiving at step 407 the request for access, the user experience may be improved, since the granting of the request need not be delayed until after both the polling of the refresh tag and the updating of the local access rules have been completed.

At step 410, the enforcer 203 receives a subsequent request for access to an applet 206 stored on the secure element 107. The applet 206 to which access is requested at step 410 may be the same as or different from the applet 206 to which access was requested at step 407.

At step 411, the enforcer 203 retrieves, from the locally stored access rules 204, one or more access rules that are associated with the applet 206 to which access was requested at step 410.

At step 412, the enforcer 203 grants or denies access to the applet 206 (stored in the secure element 107) that was requested at step 410, in accordance with the one or more corresponding access rules retrieved at step 411 from the locally stored access rules. Again, since no polling of the refresh tag is required upon receiving at step 410 the request for access, the user experience may be improved, since the granting of the request need not be delayed until after both the polling of the refresh tag and the updating of the local access rules have been completed. Additionally, since no polling of the refresh tag need be performed in between successively received requests for access to applets, processing resources may be more efficiently utilized.

IV. Example Computer-Readable Medium Implementations

The example embodiments described above, such as, for example, the systems and procedures depicted in or discussed in connection with FIGS. 1 through 4 or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general-purpose digital computers or similar devices.

Figure 5:
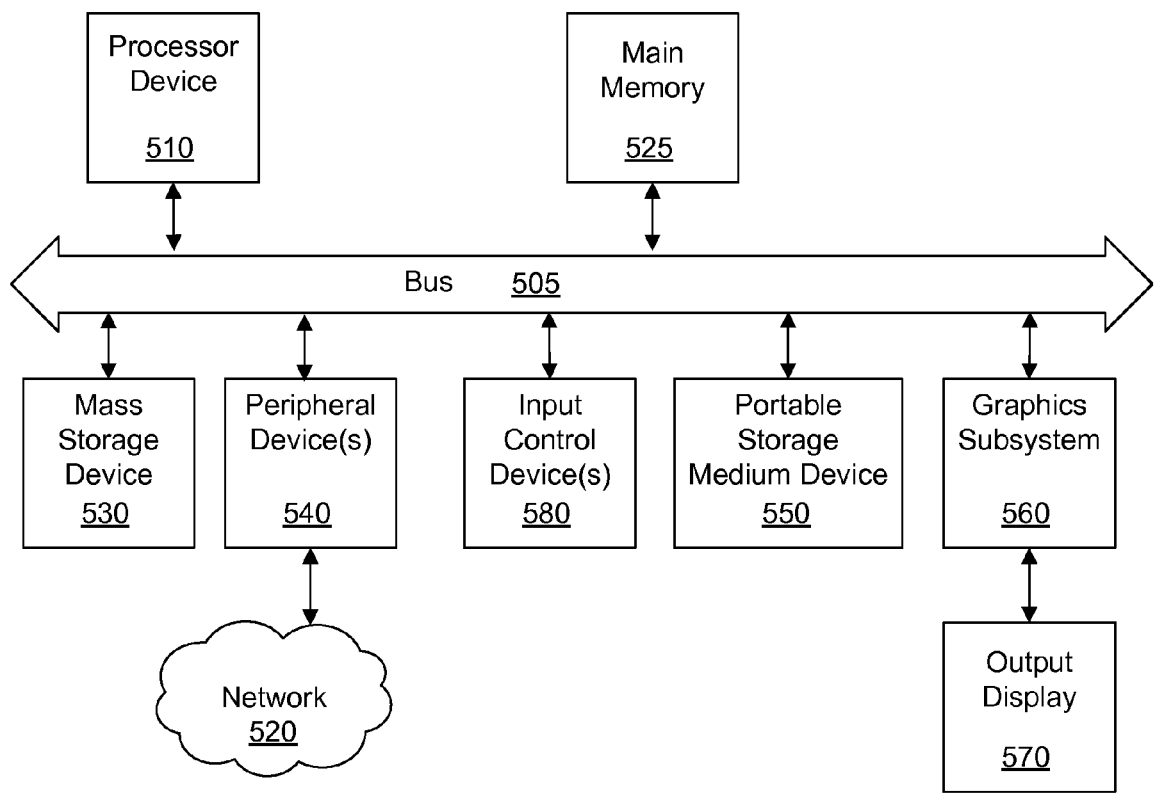
FIG. 5 is a block diagram of a general and/or special purpose computer that may be employed in accordance with various example embodiments herein.

FIG. 5 is a block diagram of a general and/or special purpose computer 500 that may be employed in accordance with various example embodiments herein. The computer 500 may be, for example, a user device, a user computer, a client computer, and/or a server computer, among other things.

The computer 500 may include without limitation a processor device 510, a main memory 525, and an interconnect bus 505. The processor device 510 may include without limitation a single microprocessor, or may include a plurality of microprocessors for configuring the computer 500 as a multi-processor system. The main memory 525 stores, among other things, instructions and/or data for execution by the processor device 510. The main memory 525 may include banks of dynamic random access memory (DRAM), as well as cache memory.

The computer 500 may further include a mass storage device 530, peripheral device(s) 540, portable storage medium device(s) 550, input control device(s) 580, a graphics subsystem 560, and/or an output display 570. For explanatory purposes, all components in the computer 500 are shown in FIG. 5 as being coupled via the bus 505. However, the computer 500 is not so limited. Devices of the computer 500 may be coupled via one or more data transport means. For example, the processor device 510 and/or the main memory 525 may be coupled via a local microprocessor bus. The mass storage device 530, peripheral device(s) 540, portable storage medium device(s) 550, and/or graphics subsystem 560 may be coupled via one or more input/output (I/O) buses. The mass storage device 530 may be a nonvolatile storage device for storing data and/or instructions for use by the processor device 510. The mass storage device 530 may be implemented, for example, with a magnetic disk drive or an optical disk drive. In a software embodiment, the mass storage device 530 is configured for loading contents of the mass storage device 530 into the main memory 525.

The portable storage medium device 550 operates in conjunction with a nonvolatile portable storage medium, such as, for example, a compact disc read only memory (CD-ROM), to input and output data and code to and from the computer 500. In some embodiments, the software for storing an internal identifier in metadata may be stored on a portable storage medium, and may be inputted into the computer 500 via the portable storage medium device 550. The peripheral device(s) 540 may include any type of computer support device, such as, for example, an input/output (I/O) interface configured to add additional functionality to the computer 500. For example, the peripheral device(s) 540 may include a network interface card for interfacing the computer 500 with a network 520.

The input control device(s) 580 provide a portion of the user interface for a user of the computer 500. The input control device(s) 580 may include a keypad and/or a cursor control device. The keypad may be configured for inputting alphanumeric characters and/or other key information. The cursor control device may include, for example, a mouse, a trackball, a stylus, and/or cursor direction keys. In order to display textual and graphical information, the computer 500 may include the graphics subsystem 560 and the output display 570. The output display 570 may include a cathode ray tube (CRT) display and/or a liquid crystal display (LCD). The graphics subsystem 560 receives textual and graphical information, and processes the information for output to the output display 570.

Each component of the computer 500 may represent a broad category of a computer component of a general and/or special purpose computer. Components of the computer 500 are not limited to the specific implementations provided here.

Portions of the example embodiments of the invention may be conveniently implemented by using a conventional general-purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-Ray Disc, a DVD, a CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

As can be appreciated in view of the foregoing description, the example aspects herein provide a system, method, and computer-readable medium for managing access control that enable access rules to be updated and enforced in an efficient manner that improves both the user's experience and the utilization of computing resources (e.g., the utilization of processor power, processor time, memory, communication channels, and the like).

Unlike existing approaches to managing access control, which employ an inefficient polling scheme whereby, for example, a refresh tag associated with access rules is periodically polled, irrespective of whether any updates have been made to the access rules, in accordance with the example aspects described herein, updates to access rules are retrieved only upon the rules having been updated.

Also, the example aspects described herein, unlike existing approaches, avoid the need to poll the refresh tag upon receiving a request for information and/or an action protected by the access rules. The user's experience is thus improved since the granting of the request need not be delayed until after both the polling of the refresh tag and the updating of the local access rules have been completed.

While various example embodiments of the invention have been described above, it should be understood that they have been presented by way of example, and not limitation. It is apparent to persons skilled in the relevant art(s) that various changes in form and detail can be made therein. Thus, the invention should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method to manage access control, comprising:
   storing, by a mobile communication device, a first set of access control rules in a memory of the mobile communication device separate from a secure element communicatively coupled to the mobile communication device, the first set of access control rules governing access by one or more service applications resident on the mobile communication device to one or more applets resident on the secure element;
   receiving, by the secure element from a trusted server via a communication network, a second set of access control rules comprising one or more updates to one or more of the first set of access control rules, wherein the second set of access control rules comprises at least an update to a particular access control rule governing access by a particular service application resident on the mobile communication device to one or more particular applets of the one or more applets resident on the secure element;
   storing, by the secure element, the second set of access control rules received from the trusted server to replace the first set of access control rules stored in the secure element;
   receiving, by the mobile communication device from the trusted server via the communication network, a notification message indicating that the particular access control rule has been updated by the trusted server in the secure element;
   in response to receiving the notification message, retrieving, by the mobile communication device and from the secure element, the second set of access control rules comprising at least the updated particular access control rule;
   updating, by the mobile communication device, the first set of access control rules based on the second set of access control rules retrieved from the secure element;
   receiving, by the mobile communication device and from the particular service application resident on the mobile communication device, a request to access one or more of the one or more particular applets resident on the secure element, one or more applet identifiers corresponding to the one or more particular applets, and an identifier associated with the particular service application;
   identifying, by the mobile communication device, one or more applicable access control rules of the updated first set of access control rules, wherein applicable access control rules state whether the particular service application identified by the identifier associated with the particular service application is permitted to access the one or more particular applets identified by the one or more corresponding applet identifiers; and
   in response to identifying the one or more applicable access control rules, accessing the requested one or more of the one or more particular applets resident on the secure element via the particular service application resident on the mobile communication device, in accordance with the identified one or more applicable access control rules of the updated first set of access control rules.

2. The method of claim 1, wherein the notification message is pushed to the mobile communication device each time the trusted server transmits an update message to the secure element to cause at least one access control rule of the second set of access control rules to be updated.

3. The method of claim 2, wherein the trusted server pushes the notification message to the mobile communication device by way of a notification server.

4. The method of claim 1, further comprising:
   accessing, in succession via the particular service application resident on the mobile communication device, a plurality of applets resident on the secure element, without performing a polling process of a refresh tag of the secure element in between each accessing.

5. The method of claim 1, wherein the mobile communication device includes the secure element.

6. A system to manage access control, comprising:
   at least one memory separate from a memory of a secure element, operable to store a first set of access control rules, the first set of access control rules governing access by one or more service applications resident on a mobile communication device to one or more applets resident on the secure element; and
   a computer processor coupled to the at least one memory, the computer processor being operable to:
     receive, by the secure element, a second set of access control rules from a trusted server via a communication network and comprising one or more updates to one or more of the first set of access control rules, wherein the second set of access control rules comprises at least an update to a particular access control rule governing access by a particular service application resident on the mobile communication device to one or more particular applets of the one or more applets resident on the secure element;
     receive, from the trusted server via the communication network, a notification message indicating that the particular access control rule has been updated by the trusted server in the secure element;
     in response to receiving the notification message, retrieve from the secure element the second set of access control rules comprising at least the updated particular access control rule,
     update the first set of access control rules based on the second set of access control rules retrieved from the secure element;
     receive, from the particular service application, a request to access one or more of the one or more particular applets resident on the secure element, one or more applet identifiers corresponding to the one or more particular applets, and an identifier associated with the particular service application;
     identify one or more applicable access control rules of the updated first set of access control rules, wherein applicable access control rules state whether the particular service application identified by the identifier associated with the particular service application is permitted to access the one or more particular applets identified by the one or more corresponding applet identifiers; and in response to identifying the one or more applicable access control rules, access the requested one or more of the one or more particular applets resident on the secure element via the particular service application, in accordance with the identified one or more applicable access control rules of the updated first set of access control rules.

7. The system of claim 6, wherein the trusted server is communicatively coupled to the system via the communication network, and wherein the notification message is pushed to the computer processor each time the trusted server transmits an update message to the secure element to cause at least one access control rule of the second set of access control rules to be updated.

8. The system of claim 7, wherein the trusted server pushes the notification message to the computer processor by way of a notification server.

9. The system of claim 6, the computer processor being further operable to:

access, in succession a plurality of applets resident on the secure element in accordance with the updated first set of access control rules without performing a polling process of a refresh tag of the secure element in between each accessing.

10. The system of claim 6, further comprising the secure element.

11. The system of claim 6, wherein the computer processor is further operable to:

communicate the request to access the one or more of the one or more particular applets resident on the secure element, wherein the retrieval of the second set of access control rules from the secure element is performed before the communication of the request to access the one or more of the one or more particular applets resident on the secure element.

12. The system of claim 6, wherein the access control rule that has been updated indicates whether the particular service application resident on the mobile communication device has permission to access the particular applet resident on the secure element.

13. A non-transitory computer readable medium having stored thereon sequences of instructions that, when executed by a computer processor, cause the computer processor to manage access control by:

storing a first set of access control rules in a memory of a mobile communication device separate from a secure element communicatively coupled to the mobile communication device, the first set of access control rules governing access by one or more service applications resident on the mobile communication device to one or more applets resident on the secure element;

receiving, by the secure element from a trusted server via a communication network, a second set of access control rules comprising one or more updates to one or more of the first set of access control rules, wherein the second set of access control rules comprises at least an update to a particular access control rule governing access by a particular service application on the mobile communication device to one or more particular applets of the one or more applets resident on the secure element;

receiving, by the mobile communication device from the trusted server via the communication network, a notification message indicating that the particular access control rule has as been updated by the trusted server in the secure element;

in response to receiving the notification message, retrieving, by the mobile communication device and from the secure element, the second set of access control rules comprising at least the updated particular access control rule, updating the first set of access control rules based on the second set of access control rules retrieved from the secure element;

receiving, by the mobile communication device and from the particular service application resident on the mobile communication device, a request to access one or more of the one or more particular applets resident on the secure element, one or more applet identifiers corresponding to the one or more particular applets, and an identifier associated with the particular service application;

identifying, by the mobile communication device, one or more applicable access control rules of the updated first set of access control rules, wherein applicable access control rules state whether the particular service application identified by the identifier associated with the particular service application is permitted to access the one or more particular applets identified by the one or more corresponding applet identifiers; and in response to identifying the one or more applicable access control rules, accessing the requested one or more of the one or more particular applets resident on the secure element via the particular service application resident on the mobile communication device, in accordance with the identified one or more applicable access control rules of the updated first set of access control rules.

14. The non-transitory computer readable medium of claim 13, wherein the notification message is pushed to the mobile communication device each time the trusted server transmits an update message to the secure element to cause at least one access control of the second set of access control rules to be updated.

15. The non-transitory computer readable medium of claim 14, wherein the trusted server pushes the notification message to the mobile communication device by way of a notification server.

16. The non-transitory computer readable medium of claim 13, wherein the sequences of instructions, when executed by the computer processor, further cause the computer processor to:

access, in succession, a plurality of applets resident on the secure element in accordance with the updated first set of access control rules, without performing a polling process of a refresh tag of the secure element in between each accessing.

17. The non-transitory computer readable medium of claim 13, wherein the sequences of instructions, when executed by the computer processor, further cause the computer processor to:

communicate the request to access the one or more of the one or more particular applets resident on the secure element, wherein the retrieval of the second set of access control rules from the secure element is performed at a time before the communication of the request to access the one or more of the one or more particular applets resident on the secure element.

18. The non-transitory computer readable medium of claim 13, wherein the access control rule that has been updated indicates whether the particular service application resident on the mobile communication device has permission to access the particular applet resident on the secure element.

* * * * *

UNITED STATES PATENT AND TRADEMARK OFFICE
CERTIFICATE OF CORRECTION

PATENT NO. : 9,495,558 B2
APPLICATION NO. : 14/224886
DATED : November 15, 2016
INVENTOR(S) : Danny Sung and Tommy Poon It is certified that error appears in the above-identified patent and that said Letters Patent is hereby corrected as shown below:

In the Claims

Column 18, Line 4 should read --"control rule has been updated by the trusted server in"--

Signed and Sealed this
Twenty-eighth Day of February, 2017

Michelle K. Lee
*Director of the United States Patent and Trademark Office*